United States Patent
Kinoshita

(10) Patent No.: US 10,800,411 B2
(45) Date of Patent: Oct. 13, 2020

(54) VEHICLE CONTROL APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 263 days.

(21) Appl. No.: 16/000,506

(22) Filed: Jun. 5, 2018

(65) Prior Publication Data

US 2019/0047560 A1    Feb. 14, 2019

(30) Foreign Application Priority Data

Aug. 10, 2017   (JP) .................................. 2017-154924

(51) Int. Cl.
| | |
|---|---|
| *B60W 30/10* | (2006.01) |
| *B60W 10/18* | (2012.01) |
| *B60W 10/20* | (2006.01) |
| *G05D 1/00* | (2006.01) |

(52) U.S. Cl.
CPC ............ *B60W 30/10* (2013.01); *B60W 10/18* (2013.01); *B60W 10/20* (2013.01); *G05D 1/0088* (2013.01); *G05D 2201/0213* (2013.01)

(58) Field of Classification Search
CPC ...... B60W 30/10; B60W 10/18; B60W 10/20; G05D 2201/213
USPC .......................................................... 701/23
See application file for complete search history.

(56) References Cited

U.S. PATENT DOCUMENTS

| | | | | |
|---|---|---|---|---|
| 2017/0066436 | A1* | 3/2017 | Endo | ...................... B60K 6/387 |
| 2017/0080907 | A1* | 3/2017 | Goto | ..................... B60T 13/146 |
| 2017/0297433 | A1* | 10/2017 | Shibachi | ............... H02J 7/1423 |
| 2017/0313325 | A1* | 11/2017 | Asakura | ................ B60W 50/12 |

(Continued)

FOREIGN PATENT DOCUMENTS

| | | |
|---|---|---|
| JP | 2013-256267 A | 12/2013 |
| JP | 2016-002876 A | 1/2016 |
| JP | 2016-195473 A | 11/2016 |

(Continued)

OTHER PUBLICATIONS

Japanese Office Action, dated Jan. 29, 2019, in Japanese Application No. 2017-154924 and English Translation thereof.

*Primary Examiner* — Yazan A Soofi

(74) *Attorney, Agent, or Firm* — McGinn i.P. Law Group, PLLc.

(57) ABSTRACT

A vehicle control apparatus includes a first power supply system, a second power supply system, a switch, and a switch controller. The first power supply system includes a driving controller that executes an automated driving control, and a first electricity storage device coupled to the driving controller. The second power supply system includes an electric motor coupled to an engine, and a second electricity storage device coupled to the electric motor. The switch is controlled to an electrically conductive state and a cutoff state. The electrically conductive state includes coupling the first and second power supply systems to each other. The cutoff state includes isolating the first and second power supply systems from each other. The switch controller controls the switch to the electrically conductive state, on the condition that the automated driving control is being executed.

19 Claims, 10 Drawing Sheets

(56) References Cited

U.S. PATENT DOCUMENTS

2017/0349048 A1* 12/2017 Nakayama .............. B60L 1/003
2019/0184808 A1* 6/2019 Iwamitsu .............. B60W 10/00

FOREIGN PATENT DOCUMENTS

| JP | 2017-192236 A | 10/2017 |
| JP | 2017-218013 A | 12/2017 |
| JP | 2018-069900 A | 5/2018 |

* cited by examiner

VEHICLE CONTROL APPARATUS

CROSS-REFERENCE TO RELATED APPLICATIONS

The present application claims priority from Japanese Patent Application No. 2017-154924 filed on Aug. 10, 2017, the entire contents of which are hereby incorporated by reference.

BACKGROUND

The technology relates to a vehicle control apparatus that executes an automated driving control of a vehicle.

As a vehicle control apparatus to be mounted on a vehicle, there has been proposed a control apparatus including an electric motor coupled to an engine. For example, reference is made to Japanese Unexamined Patent Application Publication (JP-A) No. 2013-256267. The control apparatus as described in JP-A No. 2013-256267 includes a lead battery and a lithium-ion battery, as electricity storage devices that supply electric power to the electric motor and an electric load. The lead battery and the lithium-ion battery are coupled to each other. The control apparatus as described in JP-A No. 2013-256267 releases the coupling of the lead battery to the lithium-ion battery, in powering the electric motor for engine torque assistance. This allows for appropriate electric power supply from the lead battery to the electric load, even in a case with a rapid increase in electric power supplied from the lithium-ion battery to the electric motor.

SUMMARY

An aspect of the technology provides a vehicle control apparatus configured to execute an automated driving control of a vehicle including an engine. The vehicle control apparatus includes a first power supply system, a second power supply system, a switch, and a switch controller. The first power supply system includes a driving controller and a first electricity storage device. The driving controller is being configured to execute the automated driving control. The first electricity storage device is coupled to the driving controller. The second power supply system includes an electric motor and a second electricity storage device. The electric motor is being configured to be coupled to the engine. The second electricity storage device is coupled to the electric motor. The switch is being configured to be controlled to an electrically conductive state and a cutoff state. The electrically conductive state includes coupling the first power supply system and the second power supply system to each other. The cutoff state includes isolating the first power supply system and the second power supply system from each other. The switch controller is being configured to control the switch to the electrically conductive state, on the condition that the automated driving control is being executed.

An aspect of the technology provides a vehicle control apparatus that executes an automated driving control of a vehicle including an engine. The vehicle control apparatus includes a first power supply system, a second power supply system, and a switch. The first power supply system includes a driving controller and a first electricity storage device. The driving controller executes the automated driving control. The first electricity storage device is coupled to the driving controller. The second power supply system includes an electric motor and a second electricity storage device. The electric motor is coupled to the engine. The second electricity storage device is coupled to the electric motor. The switch is controlled to an electrically conductive state and a cutoff state. The electrically conductive state includes coupling the first power supply system and the second power supply system to each other. The cutoff state includes isolating the first power supply system and the second power supply system from each other. The driving controller permits the automated driving control on the condition that the switch is in the electrically conductive state. The driving controller prohibits the automated driving control on a condition that the switch is in the cutoff state.

An aspect of the technology provides a vehicle control apparatus that executes an automated driving control of a vehicle including an engine. The vehicle control apparatus includes a first power supply system, a second power supply system, a first switch, a second switch, and a switch controller. The first power supply system includes a driving controller and a first electricity storage device. The driving controller executes the automated driving control. The first electricity storage device is coupled to the driving controller. The second power supply system includes an electric motor and a second electricity storage device. The electric motor is coupled to the engine. The second electricity storage device is coupled to the electric motor. The first switch is controlled to an electrically conductive state and a cutoff state. The electrically conductive state of the first switch includes coupling the first power supply system and the second power supply system to each other. The cutoff state of the first switch includes isolating the first power supply system and the second power supply system from each other. The second switch is controlled to an electrically conductive state and a cutoff state. The electrically conductive state of the second switch includes coupling the electric motor and the second electricity storage device to each other. The cutoff state of the second switch includes isolating the electric motor and the second electricity storage device from each other. The switch controller controls both the first switch and the second switch to the electrically conductive state, on the condition that the automated driving control is being executed.

An aspect of the technology provides a vehicle control apparatus that executes an automated driving control of a vehicle including an engine. The vehicle control apparatus includes a first power supply system, a second power supply system, a first switch, and a second switch. The first power supply system includes a driving controller and a first electricity storage device. The driving controller executes the automated driving control. The first electricity storage device is coupled to the driving controller. The second power supply system includes an electric motor and a second electricity storage device. The electric motor is coupled to the engine. The second electricity storage device is coupled to the electric motor. The first switch is controlled to an electrically conductive state and a cutoff state. The electrically conductive state of the first switch includes coupling the first power supply system and the second power supply system to each other. The cutoff state of the first switch includes isolating the first power supply system and the second power supply system from each other. The second switch is controlled to an electrically conductive state and a cutoff state. The electrically conductive state of the second switch includes coupling the electric motor and the second electricity storage device to each other. The cutoff state of the second switch includes isolating the electric motor and the second electricity storage device from each other. The driving controller permits the automated driving control on the condition that both the first switch and the second switch are in the electrically conductive state. The driving controller prohibits the automated driving control on the condition that the first switch or the second switch, or both are in the cutoff state.

DETAILED DESCRIPTION

Figure 1:
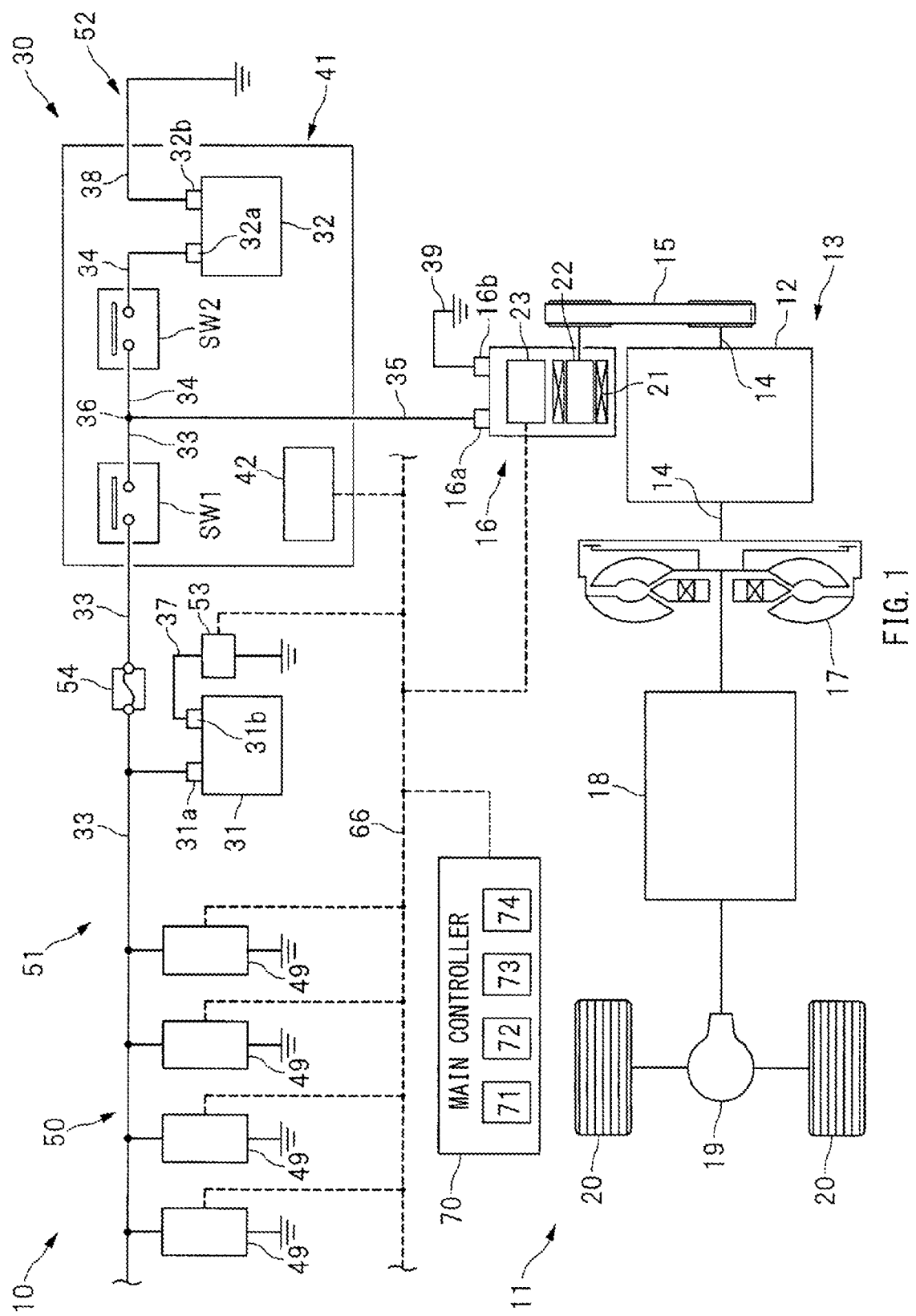
FIG. 1 schematically illustrates a configuration example of a vehicle provided with a vehicle control apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

A control apparatus as described in JP-A No. 2013-256267 prohibits an electric motor from performing torque assistance accompanied by cancellation of battery coupling, in a case where a failure in a current sensor hinders a discharge state of a lead battery from being grasped. This makes it possible to maintain the coupling of the lead battery to a lithium-ion battery, allowing for appropriate functioning of the control apparatus by electric power supply from the lithium-ion battery even in a case with occurrence of an abnormality in the lead battery. However, the appropriate functioning of the control apparatus has been still difficult in the case with the occurrence of the abnormality in the lead battery, with the electric motor executing the torque assistance, i.e., with the lead battery and the lithium-ion battery being isolated.

It is desirable to provide a vehicle control apparatus that is able to function appropriately, even in a case with occurrence of an abnormality in an electricity storage device.

FIG. 1 is a schematic diagram illustrating a configuration example of a vehicle 11 provided with a vehicle control apparatus 10 according to an example implementation of the technology. Referring to FIG. 1, on the vehicle 11, the vehicle control apparatus 10 according to this implementation is mounted. Moreover, on the vehicle 11, a power unit 13 may be mounted. The power unit 13 may include an engine 12 that serves as a power source. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. In one implementation, the starter generator 16 may serve as an "electric motor".

The starter generator 16 is coupled to the engine 12. The starter generator 16 may be a so-called integrated starter generator (ISG) that serves both as an electric generator and an electric motor. The starter generator 16 may serve not only as the electric generator to be driven by the crankshaft 14 but also as the electric motor that causes rotation of the crankshaft 14. The starter generator 16 may be controlled to a powering state as the electric motor, for example, in restarting the engine 12 in an idling stop control, and in performing an assistance drive of the engine 12 during travel of the vehicle 11, e.g., at the time of a start or acceleration.

The starter generator 16 may include a stator 21 having a stator coil and a rotor 22 having a field coil. The starter generator 16 may further include an ISG controller 23 in order to control an electrically conductive state of each of the stator coil and the field coil. The ISG controller 23 may include, for example, an inverter, a regulator, and a microcomputer. The ISG controller 23 may control the electrically conductive state of each of the field coil and the stator coil, thus controlling, for example, a power-generation voltage, power-generation torque, and powering torque of the starter generator 16.

[Power Supply Circuit]

Figure 2:
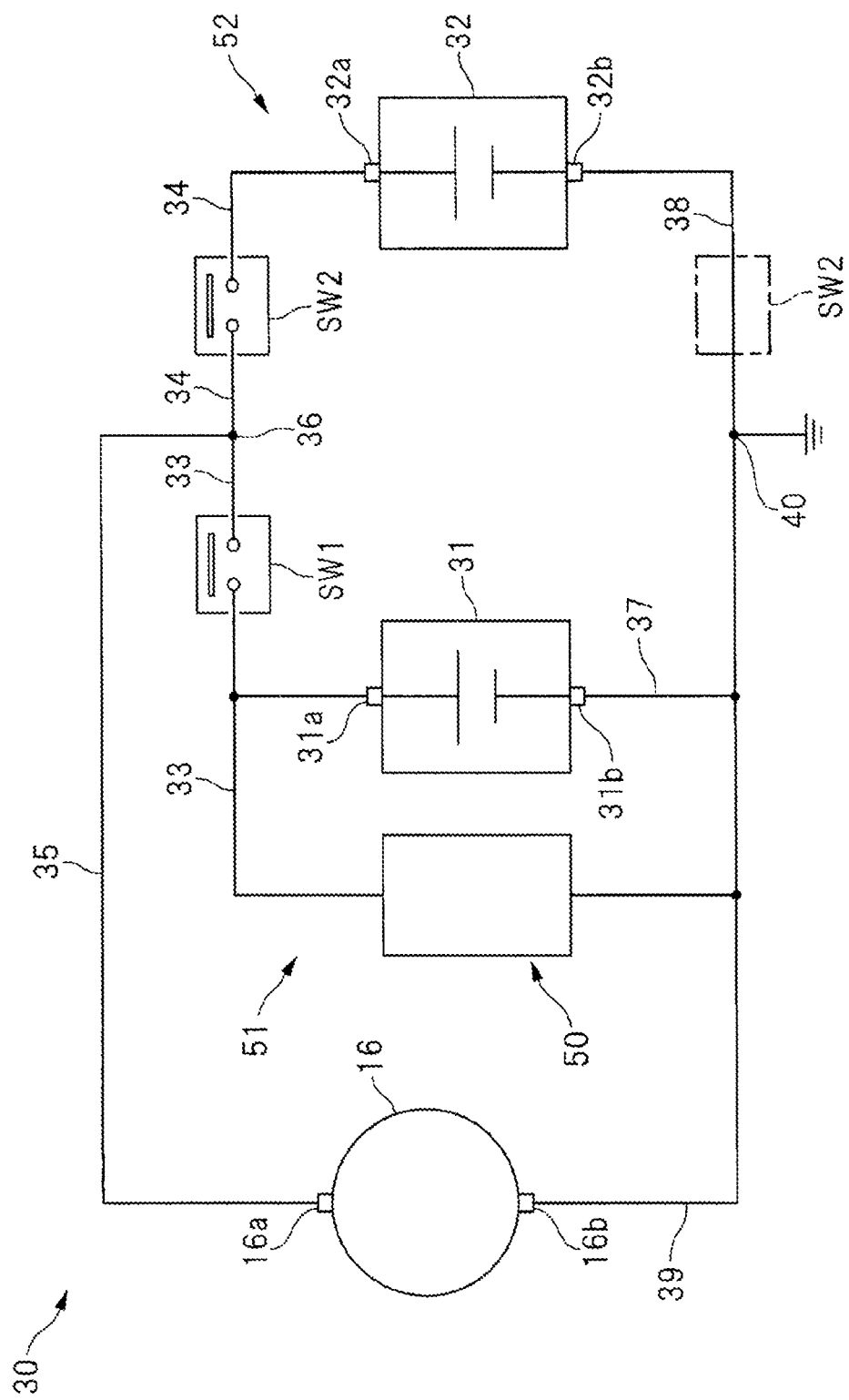
FIG. 2 is a circuit diagram illustrating an example of a power supply circuit.

A description is given of a power supply circuit 30 included in the vehicle control apparatus 10. FIG. 2 is a circuit diagram illustrating an example of the power supply circuit 30. Referring to FIG. 2, the power supply circuit 30 may include a lead battery 31 and a lithium-ion battery 32. The lead battery 31 may be electrically coupled to the starter generator 16. The lithium-ion battery 32 may be electrically coupled to the starter generator 16, in parallel to the lead battery 31. In one implementation, the lead battery 31 may serve as a "first electricity storage device", and the lithium-ion battery 32 may serve as a "second electricity storage device". A terminal voltage of the lithium-ion battery 32 may be higher in design than a terminal voltage of the lead battery 31, in order to actively cause discharge of the lithium-ion battery 32. Further, internal resistance of the lithium-ion battery 32 may be smaller in design than internal resistance of the lead battery 31, in order to actively cause charge and the discharge of the lithium-ion battery 32.

The lead battery 31 may include a positive electrode terminal 31a coupled to a positive electrode line 33. The lithium-ion battery 32 may include a positive electrode terminal 32a coupled to a positive electrode line 34. The starter generator 16 may include a positive electrode terminal 16a coupled to a positive electrode line 35. These positive electrode lines 33 to 35 may be coupled to one another via a node 36. The lead battery 31 may include a negative electrode terminal 31b coupled to a negative electrode line 37. The lithium-ion battery 32 may include a negative electrode terminal 32b coupled to a negative electrode line 38. The starter generator 16 may include a negative electrode terminal 16b coupled to a negative electrode line 39. These negative electrode lines 37 to 39 may be coupled to one another via a reference potential point 40.

On the positive electrode line 33 of the lead battery 31, a first switch SW1 may be provided. The first switch SW1 is switched between an electrically conductive state and a cutoff state. Controlling the first switch SW1 to the electrically conductive state causes the starter generator 16 and the lead battery 31 to be coupled to each other. Controlling the first switch SW1 to the cutoff state causes the starter generator 16 and the lead battery 31 to be isolated from each other. In one implementation, the first switch SW1 may serve as a "switch" and a "first switch". Further, on the positive electrode line 34 of the lithium-ion battery 32, a second switch SW2 may be provided. The second switch SW2 is switched between an electrically conductive state and a cutoff state. Controlling the second switch SW2 to the electrically conductive state causes the starter generator 16 and the lithium-ion battery 32 to be coupled to each other. Controlling the second switch SW2 to the cutoff state causes the starter generator 16 and the lithium-ion battery 32 to be isolated from each other. In one implementation, the second switch SW2 may serve as a "second switch". The first switch SW1 and the second switch SW2 may each be a switch including a semiconductor element such as, but not limited to, a metal-oxide-semiconductor field-effect transistor (MOSFET). In an alternative implementation, the first switch SW1 and the second switch SW2 may each be a switch that mechanically opens and closes a contact by means of, for example, electromagnetic force. It is to be noted that the first switch SW1 and the second switch SW2 are each referred to as, for example, a relay or a contactor as well.

As illustrated in FIG. 1, the power supply circuit 30 may include a battery module 41. In the battery module 41, incorporated may be the lithium-ion battery 32, and the first switch SW1 and the second switch SW2. The battery module 41 may further include a battery controller 42. The battery controller 42 may include, for example, a microcomputer. The battery controller 42 may have a monitoring function and a control function. Non-limiting examples of the monitoring function may include monitoring of a state of charge SOC, a charge current, a discharge current, the terminal voltage, a cell temperature, and the internal resistance of the lithium-ion battery 32. Non-limiting examples of the control function may include controlling the first switch SW1 and the second switch SW2. It is to be noted that the state of charge SOC refers to a ratio of an electricity storage amount of the battery to a designed capacity of the battery.

To the positive electrode line 33 of the lead battery 31, an electric load group 50 may be coupled. The electric load group 50 may include a plurality of electric loads 49. Non-limiting examples of the electric loads 49 that constitute the electric load group 50 may include the ISG controller 23, the battery controller 42, controllers 60, 61, 63, 65, and 70, and actuators 62 and 64. The controllers 60, 61, 63, 65, and 70, and the actuators 62 and 64 are described later. On the negative electrode line 37 of the lead battery 31, a battery sensor 53 may be provided. The battery sensor 53 may detect charge and discharge states of the lead battery 31. The battery sensor 53 may have a detection function. Non-limiting examples of the detection function may include detection of a charge current, a discharge current, the terminal voltage, a state of charge SOC of the lead battery 31. On the positive electrode line 33 of the lead battery 31, a fuse 54 may be provided. The fuse 54 may protect, for example, the electric load group 50.

As illustrated in FIGS. 1 and 2, the power supply circuit 30 includes a first power supply system 51 and a second power supply system 52. The first power supply system 51 includes the lead battery 31 and the electric load group 50. The second power supply system 52 includes the lithium-ion battery 32 and the starter generator 16. Between the first power supply system 51 and the second power supply system 52, the first switch SW1 is provided. Controlling the first switch SW1 to the electrically conductive state causes the first power supply system 51 and the second power supply system 52 to be coupled to each other. Controlling the first switch SW1 to the cutoff state causes the first power supply system 51 and the second power supply system 52 to be isolated from each other. In one implementation, the first switch SW1 may serve as the "switch" and the "first switch".

[Control System]

Figure 3:
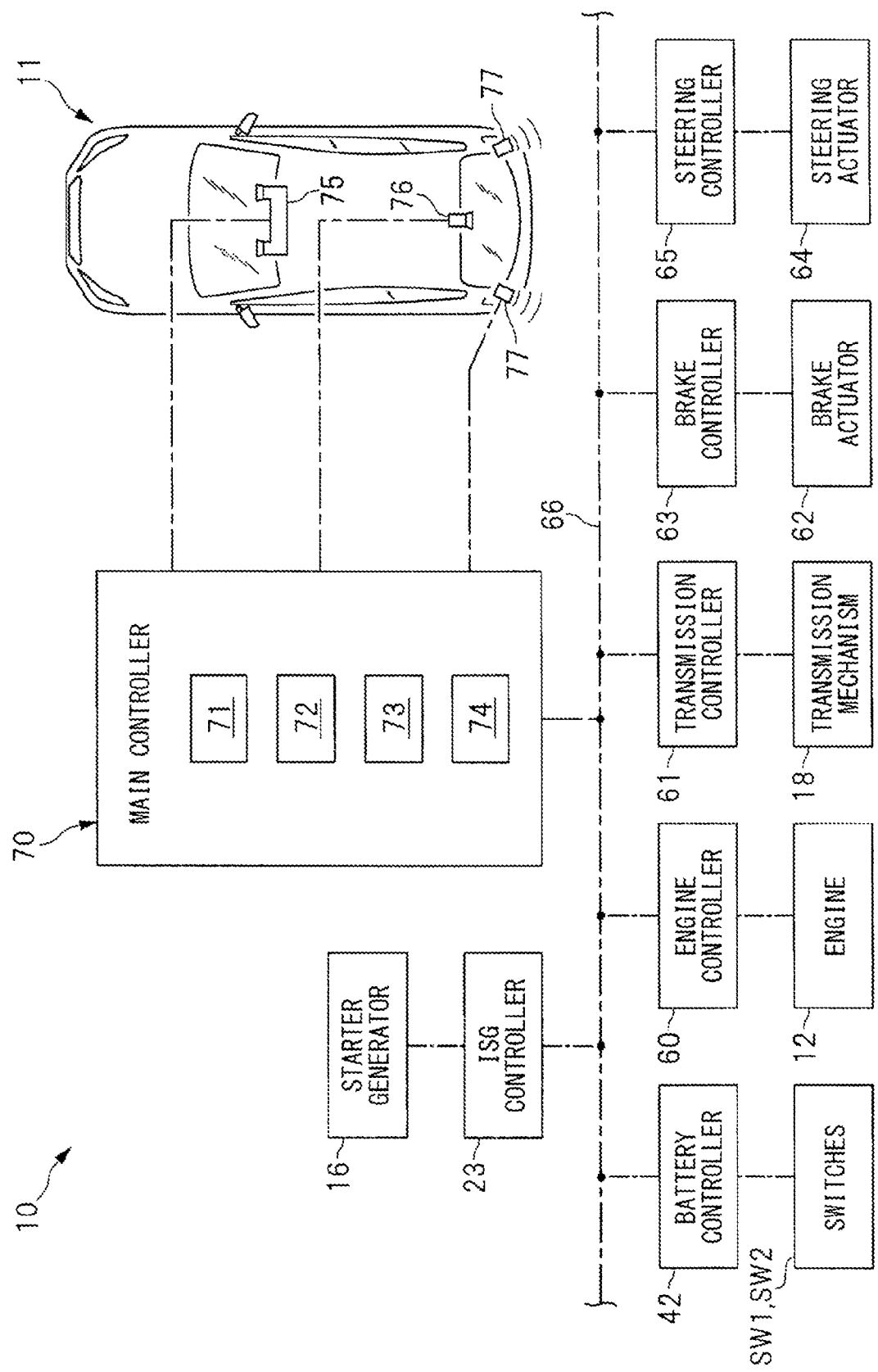
FIG. 3 is a block diagram of an example of a control system of the vehicle control apparatus.

FIG. 3 is a block diagram of an example of a control system of the vehicle control apparatus 10. Referring to FIG. 3, the vehicle control apparatus 10 may include an engine controller 60 and a transmission controller 61, in addition to the ISG controller 23 and the battery controller 42 as mentioned above. The engine controller 60 may control an operation state of the engine 12. The transmission controller 61 may control an operation state of the transmission mechanism 18. The vehicle control apparatus 10 may further include a brake controller 63 and a steering controller 65. The brake controller 63 may control a brake actuator 62 that adjusts braking power of each of the wheels 20. The steering controller 65 may control a steering actuator 64 that adjusts a steering angle of each of the wheels 20. The vehicle control apparatus 10 may further include a main controller 70 that synthetically controls the controllers 23, 42, 60, 61, 63, and 65. The controllers 23, 42, 60, 61, 63, 65, and 70 may each include, for example, a microcomputer. The controllers 23, 42, 60, 61, 63, 65, and 70 may be so coupled to one another as to be able to perform a communication mutually and freely via an on-vehicle network 66. Non-limiting examples of the on-vehicle network 66 may include a controller area network (CAN) and a local interconnect network (LIN).

Moreover, the main controller 70 may include functional units that control, for example, the power unit 13 and the power supply circuit 30. Non-limiting examples of the functional units provided in the main controller 70 may include an ISG control unit 71, a switch control unit 72, an abnormality detector 73, and an automated driving control unit 74. The ISG control unit 71 may control the starter generator 16. The switch control unit 72 may control the first switch SW1 and the second switch SW2. The abnormality detector 73 may detect an abnormal state of the lead battery 31. The automated driving control unit 74 executes an automated driving control of the vehicle 11. In one implementation, the switch control unit 72 may serve as a "switch controller".

The ISG control unit 71 of the main controller 70 may output a control signal to the ISG controller 23, and thereby control the starter generator 16 to the powering state or a power-generation state. As used herein, the power-generation state may include a combustion power-generation state and a regenerative power-generation state as described later.

For example, the ISG control unit 71 may control the starter generator 16 to the powering state, in restarting the engine 12 in the idling stop control, and in performing the assistance drive of the engine 12, for example, at the time of the start or the acceleration. Moreover, as described later, in a case where the state of charge SOC of the lithium-ion battery 32 is low, the ISG control unit 71 may raise the power-generation voltage of the starter generator 16, and thereby control the starter generator 16 to the combustion power-generation state. In a case where the state of charge SOC of the lithium-ion battery 32 is high, the ISG control unit 71 may lower the power-generation voltage of the starter generator 16, and thereby control the starter generator 16 to a power-generation suspended state. It is to be noted that the combustion power-generation state of the starter generator 16 means a state in which the starter generator 16 is driven by the engine 12, to generate electric power.

The switch control unit 72 of the main controller 70 may output a control signal to the battery controller 42, and thereby control the first switch SW1 and the second switch SW2 to the electrically conductive state or the cutoff state. For example, at the time of an engine initial start with the use of an undepicted starter motor, the switch control unit 72 may control both the first switch SW1 and the second switch SW2 to the cutoff state, in order to supply electric power from the lead battery 31 to the starter motor as one of the electric loads 49. After the engine initial start by the starter motor, the switch control unit 72 may control the first switch SW1 to the electrically conductive state, while controlling the second switch SW2 to the cutoff state, in order to cause supplementary charge of the lead battery 31 by the starter generator 16. Upon an end of the supplementary charge of the lead battery 31 after the engine initial start, the switch control unit 72 may control both the first switch SW1 and the second switch SW2 to the electrically conductive state. Moreover, as described later, in a powering control of the starter generator 16, the switch control unit 72 may control the first switch SW1 to the cutoff state. It is to be noted that the switch control unit 72 may control the second switch SW2 to the cutoff state, in a case with occurrence of an abnormality in, for example, the lithium-ion battery 32.

As mentioned above, the main controller 70 may include the automated driving control unit 74 that executes the automated driving control of the vehicle 11. Moreover, to the main controller 70, coupled may be, for example, a front camera 75, a rear camera 76, and rear sideward radar 77. The front camera 75 may capture an image frontward of the vehicle. The rear camera 76 may capture an image rearward of the vehicle. The rear sideward radar 77 may detect an obstacle rearward of the vehicle. The automated driving control unit 74 of the main controller 70 may monitor surrounding situations around the vehicle, on the basis of information from, for example, the front camera 75, the rear camera 76, and the rear sideward radar 77, while automatically controlling steering and acceleration or deceleration of the vehicle 11 in accordance with the surrounding situations. In other words, the automated driving control unit 74 may output control signals to, for example, the engine controller 60, the ISG controller 23, the transmission controller 61, the brake controller 63, and the steering controller 65, and thereby control, for example, the power unit 13, the brake actuator 62, and the steering actuator 64 in accordance with the surrounding situations around the vehicle.

As described, the main controller 70 including the automated driving control unit 74 may be provided as the electric loads 49 that constitute the electric load group 50. In other words, the automated driving control unit 74 may be provided as one of the electric loads 49 provided in the first power supply system 51. In one implementation, the automated driving control unit 74 may serve as a "driving controller". It is to be noted that the automated driving control to be executed by the main controller 70 is not limited to a control in which the main controller 70 performs all of driving operations and monitoring of the surroundings, but may include a driver-assistance control in which the main controller 70 performs part of the driving operations and the monitoring of the surroundings. Non-limiting example of the driver-assistance control may include an adaptive cruise control, a lane keeping control, and an automatic braking control. The adaptive cruise control may include causing a vehicle to perform accelerated or decelerated travel while following a preceding vehicle. The lane keeping control may include, upon a vehicle nearly deviating from a traveling lane, steering the wheels 20 to return the vehicle to the middle of the traveling lane. The automatic braking control may include, upon a vehicle coming close to an obstacle ahead of the vehicle, braking the wheels 20.

[Power Supply States]

Figure 4:
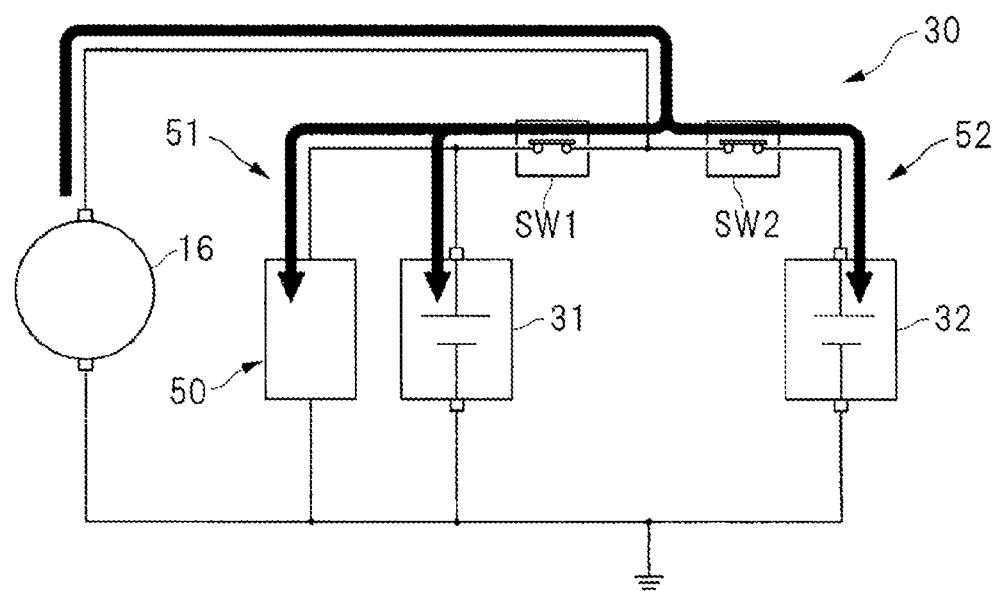
FIG. 4 describes an example of a power supply state, with a starter generator being controlled to a combustion power-generation state.
Figure 5:
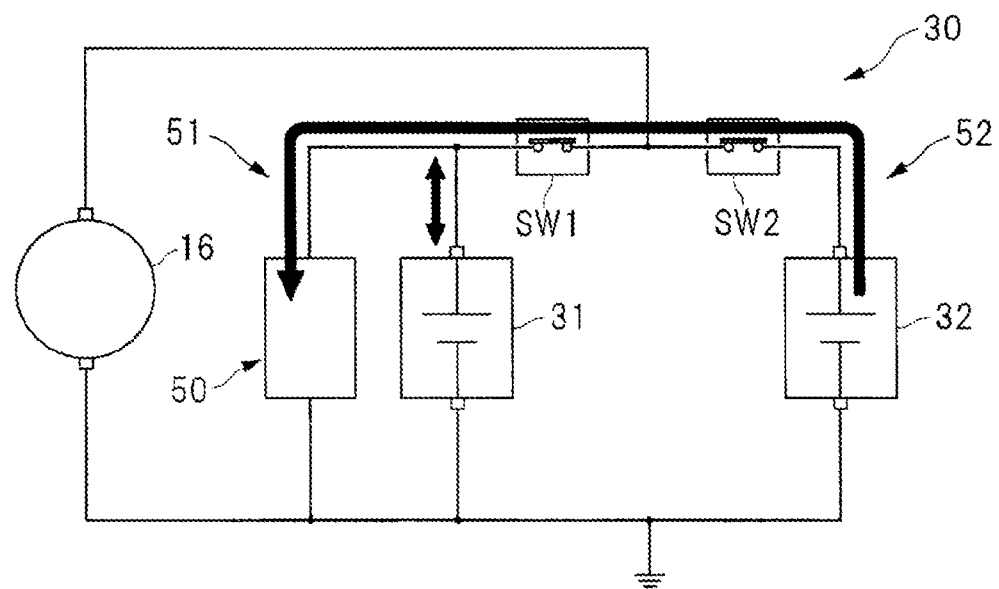
FIG. 5 describes an example of the power supply state, with the starter generator being controlled to a power-generation suspended state.
Figure 6:
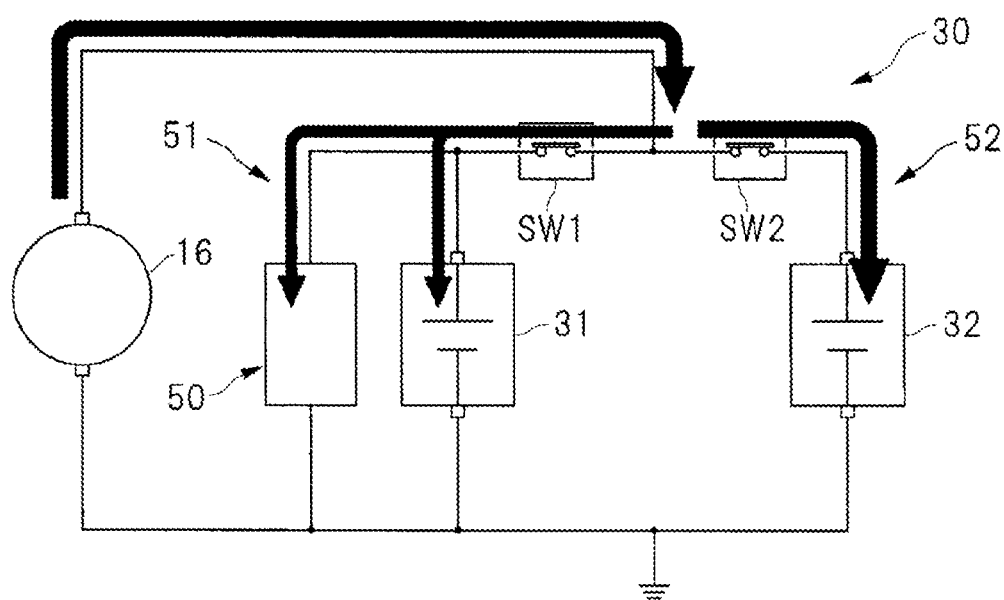
FIG. 6 describes an example of the power supply state, with the starter generator being controlled to a regenerative power-generation state.
Figure 7:
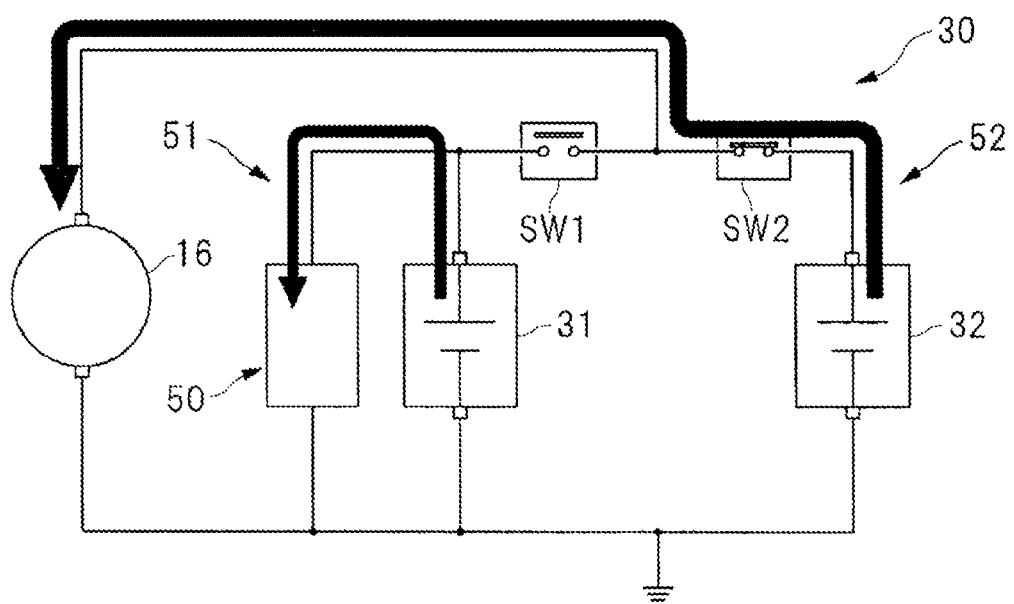
FIG. 7 describes an example of the power supply state, with the starter generator being controlled to a powering state.

A description is given of power supply states in accompaniment with a power-generation control and the powering control of the starter generator 16. FIG. 4 illustrates one example of the power supply state, with the starter generator 16 being controlled to the combustion power-generation state. FIG. 5 illustrates one example of the power supply state, with the starter generator 16 being controlled to the power-generation suspended state. FIG. 6 illustrates one example of the power supply state, with the starter generator 16 being controlled to the regenerative power-generation state. FIG. 7 illustrates one example of the power supply state, with the starter generator 16 being controlled to the powering state. It is to be noted that black arrows illustrated in FIGS. 4 to 7 represent the power supply states inside the power supply circuit 30.

Referring to FIG. 4, in a case where the electricity storage amount of the lithium-ion battery 32 has lowered, the starter generator 16 may be controlled to the combustion power-generation state. In other words, in a case where the state of charge SOC of the lithium-ion battery 32 is lower than a predetermined lower limit, the starter generator 16 may be controlled to the combustion power-generation state, in order to charge the lithium-ion battery 32 and to increase the state of charge SOC. In controlling the starter generator 16 to the combustion power-generation state, the power-generation voltage of the starter generator 16 may be raised to a greater value than the terminal voltage of the lithium-ion battery 32. This causes power-generated electric power to be supplied from the starter generator 16 to, for example, the lithium-ion battery 32, the electric load group 50, and the lead battery 31, as illustrated in FIG. 4.

Referring to FIG. 5, in a case where the electricity storage amount of the lithium-ion battery 32 is sufficient, the starter generator 16 may be controlled to the power-generation suspended state. In other words, in a case where the state of charge SOC of the lithium-ion battery 32 is higher than a predetermined upper limit, the starter generator 16 may be controlled to the power-generation suspended state, because the lithium-ion battery 32 is able to supply electric power to the electric load group 50. In controlling the starter generator 16 to the power-generation suspended state, the power-generation voltage of the starter generator 16 may be lowered to a smaller value than the terminal voltage of the lithium-ion battery 32. This causes electric power to be supplied from the lithium-ion battery 32 to, for example, the electric load group 50, as illustrated in FIG. 5. Hence, it is possible to suppress or stop power generation of the starter generator 16, and to reduce an engine load.

As mentioned above, the main controller 70 may control the starter generator 16 to the combustion power-generation state or the power-generation suspended state on the basis of the state of charge SOC. Meanwhile, on the decelerated travel, it is necessary to recover much kinetic energy, and to enhance fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the lead battery 31, the lithium-ion battery 32, and the electric load group 50. This makes it possible to supply a large current from the starter generator 16 to the lithium-ion battery 32 and the lead battery 31, as illustrated in FIG. 6. In other words, it is possible to increase the power-generated electric power of the starter generator 16. It is therefore possible to actively convert the kinetic energy to electric energy, and recover the electric energy, leading to enhancement in energy efficiency of the vehicle 11 and enhancement in the fuel consumption performance. It is to be noted that because the internal resistance of the lithium-ion battery 32 is smaller than the internal resistance of the lead battery 31, most of the power-generated current is supplied to the lithium-ion battery 32.

As illustrated in FIGS. 4 to 6, in controlling the starter generator 16 to the combustion power-generation state, the regenerative power-generation state, and the power-generation suspended state, the first switch SW1 and the second switch SW2 may be maintained in the electrically conductive state. In other words, in the vehicle control apparatus 10, it is possible to control the charge and the discharge of the lithium-ion battery 32, without making a switching control of the first switch SW1 and the second switch SW2, solely by controlling the power-generation voltage of the starter generator 16. It is therefore possible to easily control the charge and the discharge of the lithium-ion battery 32, and to enhance durability of the first switch SW1 and the second switch SW2.

Furthermore, as illustrated in FIG. 7, in controlling the starter generator 16 to the powering state, the first switch SW1 may be controlled to the cutoff state. In other words, in allowing the starter generator 16 to restart the engine 12 (i.e., at an engine restart by the starter generator 16), or in allowing the starter generator 16 to perform the assistance drive of the engine 12 during the travel of the vehicle 11 (i.e., at the time of the assistance drive by the starter generator 16), the first switch SW1 may be controlled from the electrically conductive state to the cutoff state. This causes the first power supply system 51 and the second power supply system 52 to be isolated from each other. The first power supply system 51 includes the lead battery 31 and the electric load group 50 coupled to the lead battery 31. The second power supply system 52 includes the lithium-ion battery 32 and the starter generator 16 coupled to the lithium-ion battery 32. Thus, as illustrated in FIG. 7, it is possible to supply electric power from the lead battery 31 to the electric load group 50, even in a case with an increase in current consumption of the starter generator 16. Hence, it is possible to prevent an instantaneous voltage drop with respect to the electric load group 50, allowing for appropriate functioning of the electric load group 50.

[First Fail-Safe Control]

Figure 8:
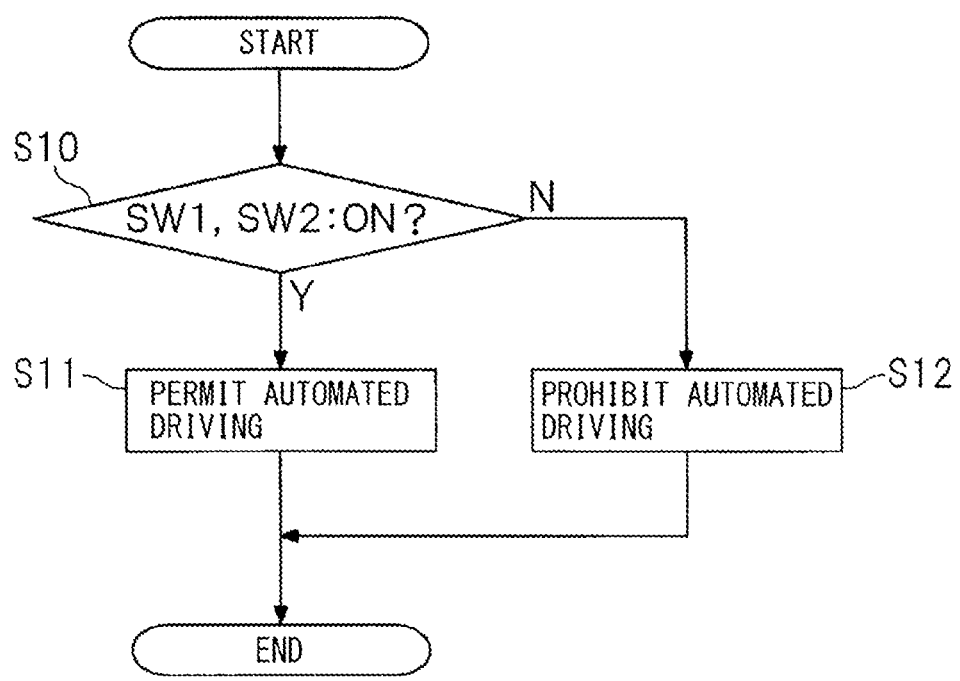
FIG. 8 is a flowchart illustrating an example of an execution procedure of a first fail-safe control.

In what follows, described is a first fail-safe control. The first fail-safe control may be executed by the main controller 70 on predetermined cycles. FIG. 8 is a flowchart illustrating one example of an execution procedure of the first fail-safe control. In FIG. 8, reference characters "ON" mean the electrically conductive state of the first switch SW1 and the second switch SW2.

Referring to FIG. 8, in step S10, a determination may be made as to whether or not the first switch SW1 and the second switch SW2 are both in the electrically conductive state. In step S10, in a case where the first switch SW1 and the second switch SW2 are both in the electrically conductive state, i.e., in a case where the lithium-ion battery 32 is coupled to the electric load group 50, the flow may proceed to step S11. In step S11, the automated driving control by the main controller 70 may be permitted. Meanwhile, in step S10, in a case where the first switch SW1 or the second switch SW2, or both are in the cutoff state, i.e., in a case where the lithium-ion battery 32 is isolated from the electric load group 50, the flow may proceed to step S12. In step S12, the automated driving control by the main controller 70 may be prohibited.

As described, in the case where the lithium-ion battery 32 is coupled to the electric load group 50, the automated driving control is permitted. Hence, it is possible to enhance reliability of the automated driving control. In other words, the automated driving control by, for example, the main controller 70 is executed, with both the lead battery 31 and the lithium-ion battery 32 being coupled to the electric load group 50. This makes it possible to continue electric power supply from the lithium-ion battery 32 to, for example, the main controller 70, even in the case with the occurrence of the abnormality in the lead battery 31, e.g., coming off of a terminal, during the automated driving control. Hence, it is possible to appropriately continue the automated driving control, without abrupt cancellation of the automated driving control. This leads to enhancement in the reliability of the automated driving control.

[Second Fail-Safe Control]

Figure 9:
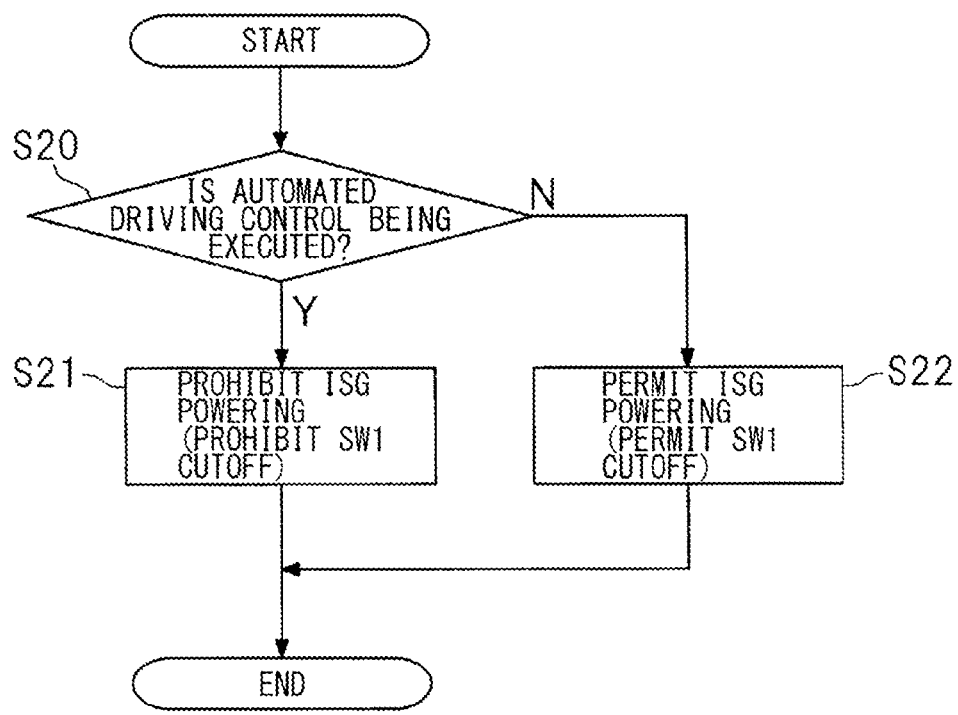
FIG. 9 is a flowchart illustrating an example of an execution procedure of a second fail-safe control.
Figure 10A:
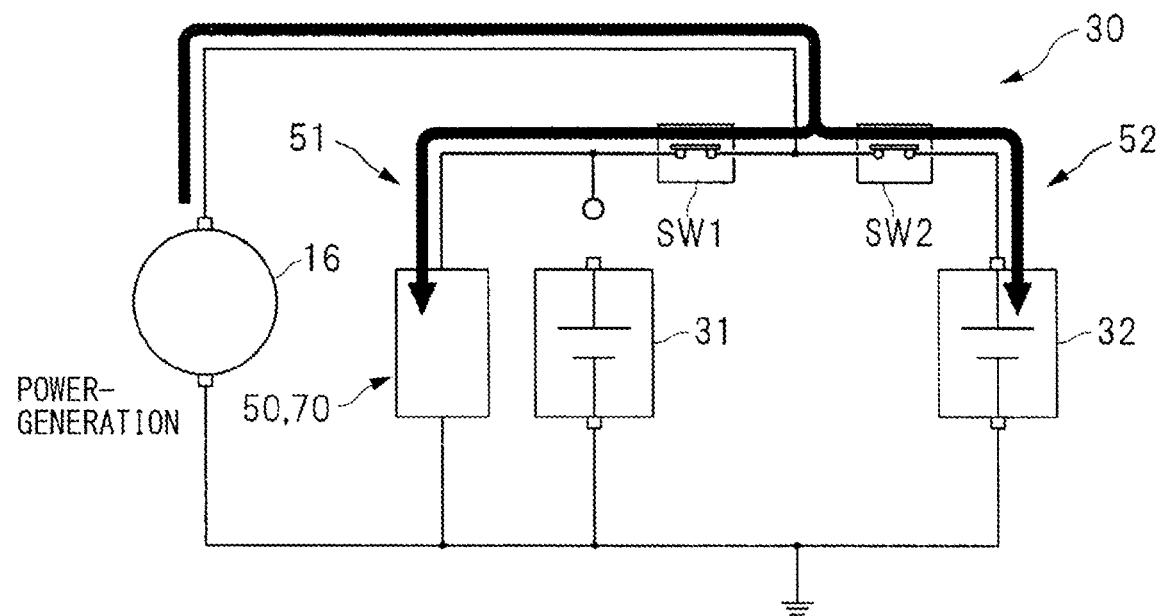
FIGS. 10A and 10B describe the power supply state, with the second fail-safe control being executed.
Figure 10B:
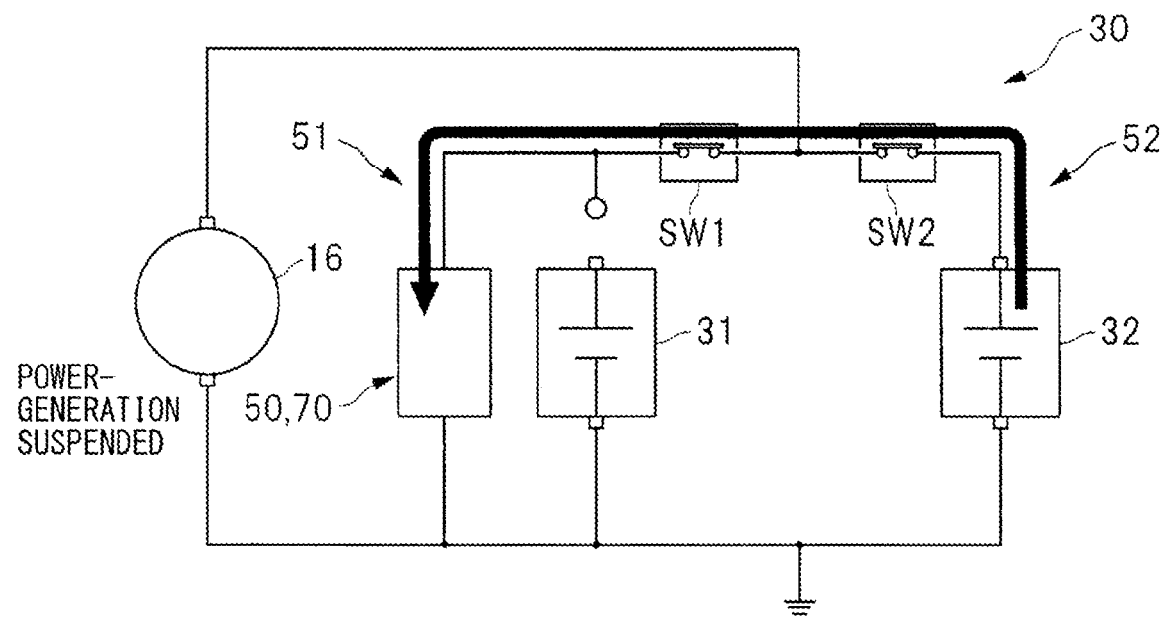

Description now moves on to a second fail-safe control. The second fail-safe control may be executed by the main controller 70 on predetermined cycles. FIG. 9 is a flowchart illustrating one example of an execution procedure of the second fail-safe control. FIGS. 10A and 10B illustrate examples of the power supply states, with the second fail-safe control being executed. In FIGS. 10A and 10B, black arrows represent the power supply states inside the power supply circuit 30.

Referring to FIG. 9, in step S20, a determination may be made as to whether or not the automated driving control is being executed. In step S20, in a case where a determination has been made that the automated driving control is being executed, the flow may proceed to step S21. In step S21, the powering control of the starter generator 16 may be prohibited. Meanwhile, in step S20, in a case where a determination has been made that the automated driving control is not being executed, the flow may proceed to step S22. In step S22, the powering control of the starter generator 16 may be permitted. Thus, in the case where the automated driving control is being executed, the engine restart and the assistance drive by the starter generator 16 may be prohibited. Accordingly, as illustrated in FIG. 7, the first switch SW1 is maintained in the electrically conductive state, without being switched to the cutoff state.

As described, in the case where the automated driving control is executed, the first switch SW1 is maintained in the electrically conductive state. Hence, it is possible to enhance the reliability of the automated driving control. In other words, the automated driving control by, for example, the main controller 70 is executed, with both the lead battery 31 and the lithium-ion battery 32 being coupled to the electric load group 50. Hence, as illustrated in FIGS. 10A and 10B, it is possible to supply electric power from the starter generator 16 or the lithium-ion battery 32 to the electric load group 50, e.g., the main controller 70, even in the case with the occurrence of the abnormality in the lead battery 31, e.g., the coming off of the terminal, with a shutdown of the electric power supply from the lead battery 31 to the electric load group 50.

In other words, as illustrated in FIG. 10A, in the case where the starter generator 16 is controlled to the power-generation state, it is possible to supply electric power from the starter generator 16 to, for example, the main controller 70 that is executing the automated driving control. Moreover, as illustrated in FIG. 10B, in the case where the starter generator 16 is controlled to the power-generation suspended state, it is possible to supply electric power from the lithium-ion battery 32 to, for example, the main controller 70 that is executing the automated driving control. This allows for normal functioning of the automated driving control, leading to the enhancement of the reliability of the automated driving control. It is to be noted that the abnormality detector 73 of the main controller 70 may detect the abnormal state of the lead battery 31 during the automated driving control, in which case a notice of cancelation of the automated driving control may be made to an occupant, with the use of an alarm display or an alarm sound. Thus, driving authority may be appropriately transferred to the occupant.

In the forgoing description, the powering control of the starter generator 16 may be prohibited in the case where the automated driving control is being executed. In other words, in the case where the automated driving control is being executed, the engine restart by the starter generator 16 may be prohibited, and the assistance drive by the starter generator 16 may be prohibited. However, this is non-limiting. For example, in the case where the automated driving control is being executed, the assistance drive by the starter generator 16 may be prohibited, but the engine restart by the starter generator 16 may be permitted. Thus, in the case where the automated driving control is being executed, it suffices to prohibit at least the powering control of the starter generator 16 during the travel of the vehicle 11.

Moreover, in the forgoing description, the first switch SW1 is controlled to the cutoff state, in the case where the starter generator 16 is controlled to the powering state, i.e., at the engine restart by the starter generator 16 or at the time of the assistance drive by the starter generator 16. However, this is non-limiting. For example, the first switch SW1 may be controlled to the cutoff state at the time of the assistance drive by the starter generator 16, while the first switch SW1 may be kept in the electrically conductive state at the engine restart by the starter generator 16. Thus, it suffices for the main controller 70 to control the first switch SW1 from the electrically conductive state to the cutoff state, at least in the case where the starter generator 16 is controlled to the powering state during the travel of the vehicle 11.

According to one implementation of the technology, the switch control unit 72 controls the first switch SW1 to the electrically conductive state, in a case where the automated driving control is being executed. Hence, it is possible to supply electric power to the automated driving control unit 74 of the main controller 70 from both the lead battery 31 and the lithium-ion battery 32. This allows for appropriate execution of the automated driving control by the automated driving control unit 74. Hence, it is possible for the vehicle control apparatus 10 to function appropriately, even in the case with the occurrence of the abnormality in the lead battery 31.

Although some implementations of the technology have been described in the forgoing with reference to the accompanying drawings, the technology is by no means limited to the implementations described above. Various changes and modifications may be made to any implementation without departing from the scope of the technology. In the forgoing description, the vehicle control apparatus 10 includes the second switch SW2. However, this is non-limiting. For example, the second switch SW2 may be eliminated from the vehicle control apparatus 10. In other words, it suffices to provide the vehicle control apparatus 10 with the first switch SW1, from a viewpoint of isolation of the first power supply system 51 and the second power supply system 52 from each other. The first power supply system 51 includes the lead battery 31 and the electric load group 50. The second power supply system 52 includes the lithium-ion battery 32 and the starter generator 16. Therefore, the second switch SW2 may be eliminated from the vehicle control apparatus 10. Moreover, in the illustrated implementations, the battery module 41 incorporates the first switch SW1 and the second switch SW2. However, this is non-limiting. The first switch SW1 and the second switch SW2 may be provided outside the battery module 41. Further, in the forgoing description, the second switch SW2 is provided on the positive electrode line 34 of the lithium-ion battery 32. However, this is non-limiting. For example, the second switch SW2 may be provided on the negative electrode line 38 of the lithium-ion battery 32, as indicated by an alternate long and short dashed line in FIG. 2.

In the forgoing description, the lead battery 31 is adopted as the "first electricity storage device", while the lithium-ion battery 32 is adopted as the "second electricity storage device". However, this is non-limiting. Other kinds of batteries or capacitors may be adopted. The first and the second electricity storage devices are not limited to different kinds of electricity storage devices, but may be the same kind of electricity storage devices. Moreover, in the forgoing description, the internal resistance of the second electricity storage device is smaller than the internal resistance of the first electricity storage device. However, this is non-limiting. The internal resistance of the second electricity storage device may be greater than the internal resistance of the first electricity storage device. In another alternative, the internal resistance of the second electricity storage device may be equal to the internal resistance of the first electricity storage device.

In the forgoing description, the starter generator 16 is adopted as the "electric motor". However, this is non-limiting. A starter motor may be adopted as the "electric motor", or alternatively, a motor generator may be adopted as the "electric motor". Moreover, in the forgoing description, the main controller 70 includes the switch control unit 72 and the automated driving control unit 74. However, this is non-limiting. For example, the switch control unit and/or the automated driving control unit may be provided in another controller or other controllers. Further, in the forgoing description, the automated driving control unit 74 of the main controller 70 exemplifies the "driving controller" that executes the automated driving control. However, this is non-limiting. For example, the ISG controller 23, the engine controller 60, the transmission controller 61, the brake actuator 62, the brake controller 63, the steering actuator 64, or the steering controller 65, or any combination thereof may serve as the "driving controller" that executes the automated driving control.

In addition, regarding the first fail-safe control and the second fail-safe control to be executed by the main controller 70, the second fail-safe control may be executed after execution of the first fail-safe control. Alternatively, the first fail-safe control may be executed independently. In another alternative, the second fail-safe control may be executed independently. It is to be noted that in the forgoing description, the abnormality in the lead battery 31 is exemplified by the coming off of the terminal. However, this is non-limiting. Whatever hinders the lead battery 31 from sufficiently discharging may constitute the abnormality in the lead battery 31. Non-limiting examples of the abnormality in the lead battery 31 may include a disconnection or a shortcircuit of the positive electrode line 33 and the negative electrode line 37 coupled to the lead battery 31, an excessive increase in a temperature of the lead battery 31, and an excessive decrease in the state of charge SOC of the lead battery 31.

The main controller 70 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 70. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 70 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus configured to execute an automated driving control of a vehicle including an engine, the vehicle control apparatus comprising:
   a first power supply system including a driving controller and a first electricity storage device, the driving controller being configured to execute the automated driving control, and the first electricity storage device being coupled to the driving controller;
   a second power supply system including an electric motor and a second electricity storage device, the electric motor being configured to be coupled to the engine, and the second electricity storage device being coupled to the electric motor;
   a switch configured to be controlled to an electrically conductive state and a cutoff state, the electrically conductive state including coupling the first power supply system and the second power supply system to each other, and the cutoff state including isolating the first power supply system and the second power supply system from each other; and
   a switch controller configured to control the switch to the electrically conductive state, on a condition that the automated driving control is being executed, such that the second electricity storage device provides power to the automated driving control of the vehicle.

2. The vehicle control apparatus according to claim 1, wherein the driving controller prohibits a powering control of the electric motor during travel of the vehicle, on a condition that the automated driving control is being executed.

3. The vehicle control apparatus according to claim 1, wherein the switch controller controls the switch to the cutoff state, on a condition that the electric motor is controlled to a powering state during travel of the vehicle.

4. The vehicle control apparatus according to claim 2, wherein the switch controller controls the switch to the cutoff state, on a condition that the electric motor is controlled to a powering state during travel of the vehicle.

5. The vehicle control apparatus according to claim 1, wherein
   the driving controller
      permits the automated driving control on a condition that the switch is in the electrically conductive state, and
      prohibits the automated driving control on a condition that the switch is in the cutoff state.

6. The vehicle control apparatus according to claim 2, wherein
   the driving controller
      permits the automated driving control on a condition that the switch is in the electrically conductive state, and
      prohibits the automated driving control on a condition that the switch is in the cutoff state.

7. The vehicle control apparatus according to claim 3, wherein
   the driving controller
      permits the automated driving control on a condition that the switch is in the electrically conductive state, and
      prohibits the automated driving control on a condition that the switch is in the cutoff state.

8. The vehicle control apparatus according to claim 4, wherein
   the driving controller
      permits the automated driving control on a condition that the switch is in the electrically conductive state, and
      prohibits the automated driving control on a condition that the switch is in the cutoff state.

9. A vehicle control apparatus configured to execute an automated driving control of a vehicle including an engine, the vehicle control apparatus comprising:
   a first power supply system including a driving controller and a first electricity storage device, the driving controller being configured to execute the automated driving control, and the first electricity storage device being coupled to the driving controller;

a second power supply system including an electric motor and a second electricity storage device, the electric motor being configured to be coupled to the engine, and the second electricity storage device being coupled to the electric motor; and a switch configured to be controlled to an electrically conductive state and a cutoff state, the electrically conductive state including coupling the first power supply system and the second power supply system to each other, and the cutoff state including isolating the first power supply system and the second power supply system from each other, the driving controller permitting the automated driving control on a condition that the switch is in the electrically conductive state, such that the second electricity storage device provides power to the automated driving control of the vehicle, and the driving controller prohibiting the automated driving control on a condition that the switch is in the cutoff state.

10. A vehicle control apparatus configured to execute an automated driving control of a vehicle including an engine, the vehicle control apparatus comprising:

a first power supply system including a driving controller and a first electricity storage device, the driving controller being configured to execute the automated driving control, and the first electricity storage device being coupled to the driving controller;

a second power supply system including an electric motor and a second electricity storage device, the electric motor being configured to be coupled to the engine, and the second electricity storage device being coupled to the electric motor;

a first switch configured to be controlled to an electrically conductive state and a cutoff state, the electrically conductive state of the first switch including coupling the first power supply system and the second power supply system to each other, and the cutoff state of the first switch including isolating the first power supply system and the second power supply system from each other;

a second switch configured to be controlled to an electrically conductive state and a cutoff state, the electrically conductive state of the second switch including coupling the electric motor and the second electricity storage device to each other, and the cutoff state of the second switch including isolating the electric motor and the second electricity storage device from each other; and a switch controller configured to control both the first switch and the second switch to the electrically conductive state, on a condition that the automated driving control is being executed, such that the second electricity storage device provides power to the automated driving control of the vehicle.

11. The vehicle control apparatus according to claim 10, wherein the driving controller prohibits a powering control of the electric motor during travel of the vehicle, on a condition that the automated driving control is being executed.

12. The vehicle control apparatus according to claim 10, wherein the switch controller controls the first switch to the cutoff state and controls the second switch to the electrically conductive state, on a condition that the electric motor is controlled to a powering state during travel of the vehicle.

13. The vehicle control apparatus according to claim 11, wherein the switch controller controls the first switch to the cutoff state and controls the second switch to the electrically conductive state, on a condition that the electric motor is controlled to a powering state during travel of the vehicle.

14. The vehicle control apparatus according to claim 10, wherein the driving controller
permits the automated driving control on a condition that both the first switch and the second switch are in the electrically conductive state, and
prohibits the automated driving control on a condition that the first switch or the second switch, or both are in the cutoff state.

15. The vehicle control apparatus according to claim 11, wherein the driving controller
permits the automated driving control on a condition that both the first switch and the second switch are in the electrically conductive state, and
prohibits the automated driving control on a condition that the first switch or the second switch, or both are in the cutoff state.

16. The vehicle control apparatus according to claim 12, wherein the driving controller
permits the automated driving control on a condition that both the first switch and the second switch are in the electrically conductive state, and
prohibits the automated driving control on a condition that the first switch or the second switch, or both are in the cutoff state.

17. The vehicle control apparatus according to claim 13, wherein the driving controller
permits the automated driving control on a condition that both the first switch and the second switch are in the electrically conductive state, and
prohibits the automated driving control on a condition that the first switch or the second switch, or both are in the cutoff state.

18. A vehicle control apparatus configured to execute an automated driving control of a vehicle including an engine, the vehicle control apparatus comprising:

a first power supply system including a driving controller and a first electricity storage device, the driving controller being configured to execute the automated driving control, and the first electricity storage device being coupled to the driving controller;

a second power supply system including an electric motor and a second electricity storage device, the electric motor being configured to be coupled to the engine, and the second electricity storage device being coupled to the electric motor;

a first switch configured to be controlled to an electrically conductive state and a cutoff state, the electrically conductive state of the first switch including coupling the first power supply system and the second power supply system to each other, and the cutoff state of the first switch including isolating the first power supply system and the second power supply system from each other; and a second switch configured to be controlled to an electrically conductive state and a cutoff state, the electrically conductive state of the second switch including coupling the electric motor and the second electricity storage device to each other, and the cutoff state of the second switch including isolating the electric motor and the second electricity storage device from each other, the driving controller permitting the automated driving control on a condition that both the first switch and the second switch are in the electrically conductive state, such that the second electricity storage device provides power to the automated driving control of the vehicle, and the driving controller prohibiting the automated driving control on a condition that the first switch or the second switch, or both are in the cutoff state.

19. The vehicle control apparatus according to claim 1, wherein a charge of the second electricity storage device is controlled, without making a switching control of the switch, solely by controlling a power-generation voltage of the electric motor.

* * * * *